(12) United States Patent
Satzger et al.

(10) Patent No.: US 9,884,537 B2
(45) Date of Patent: Feb. 6, 2018

(54) VEHICLE HAVING AN ELECTRIC HEATING DEVICE

(71) Applicant: Bayerische Motoren Werke Aktiengesellschaft, Munich (DE)

(72) Inventors: Peter Satzger, Landsberg am Lech (DE); Robert Herbolzheimer, Groebenzell (DE); Eugen Feinmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 3 days.

(21) Appl. No.: 14/937,951

(22) Filed: Nov. 11, 2015

(65) Prior Publication Data

US 2016/0059670 A1 Mar. 3, 2016

Related U.S. Application Data

(63) Continuation of application No. PCT/EP2014/064275, filed on Jul. 4, 2014.

(30) Foreign Application Priority Data

Jul. 25, 2013 (DE) .......................... 10 2013 214 548

(51) Int. Cl.
*B60H 1/00* (2006.01)
*B60H 1/22* (2006.01)
(Continued)

(52) U.S. Cl.
CPC ......... *B60H 1/2225* (2013.01); *B60H 1/2215* (2013.01); *B60R 13/02* (2013.01);
(Continued)

(58) Field of Classification Search
None
See application file for complete search history.

(56) References Cited

U.S. PATENT DOCUMENTS 6,067,404 A * 5/2000 Wilkins ................. H05B 3/748
219/520
6,222,160 B1 * 4/2001 Remke ................... A45C 11/20
219/387

(Continued)

FOREIGN PATENT DOCUMENTS

CN 201342967 Y 11/2009
CN 102762397 A 10/2012
(Continued)

OTHER PUBLICATIONS

DE 102011121574 A1, Mundinger et al, Jun. 2013, partial translation.*

(Continued)

*Primary Examiner* — Joseph M Pelham
(74) *Attorney, Agent, or Firm* — Crowell & Moring LLP

(57) ABSTRACT

A vehicle has an electric heating device which in operation reaches a temperature of more than 50° C., and includes a flat perforated decorative layer which is disposed on a front face of the heating device. Because of the perforation of the decorative layer, the heating device can radiate infrared radiation through holes provided in the decorative layer directly into a passenger compartment of the vehicle. The vehicle also has a reflector layer which is disposed on a rear face of the heating device facing away from the front face and is provided in order to reflect infrared radiation emitted by the heating device in the direction of the passenger compartment.

19 Claims, 1 Drawing Sheet

(51) Int. Cl.
*B60R 13/02* (2006.01)
*H05B 3/22* (2006.01)

(52) U.S. Cl.
CPC ........ *H05B 3/22* (2013.01); *B60R 2013/0287* (2013.01); *H05B 2203/032* (2013.01)

(56) References Cited

U.S. PATENT DOCUMENTS

| | | | | |
|---|---|---|---|---|
| 8,692,168 | B2* | 4/2014 | Benda | A61H 33/063 |
| | | | | 219/213 |
| 2005/0051538 | A1* | 3/2005 | Guckert | F28F 21/02 |
| | | | | 219/544 |
| 2005/0225128 | A1 | 10/2005 | Diemer et al. | |
| 2010/0000981 | A1* | 1/2010 | Diemer | H05B 3/146 |
| | | | | 219/202 |
| 2010/0176110 | A1* | 7/2010 | Ogino | B60H 1/00271 |
| | | | | 219/202 |
| 2012/0061365 | A1* | 3/2012 | Okamoto | B60H 1/2225 |
| | | | | 219/202 |
| 2012/0217232 | A1 | 8/2012 | Hermann et al. | |
| 2015/0291006 | A1* | 10/2015 | Jung | B60H 1/2215 |
| | | | | 296/97.23 |
| 2016/0167482 | A1* | 6/2016 | Oh | B60H 1/2225 |
| | | | | 219/202 |

FOREIGN PATENT DOCUMENTS

| | | | |
|---|---|---|---|
| DE | 10 2009 052 535 A1 | 5/2011 | |
| DE | 20 2012 101 313 U1 | 8/2012 | |
| DE | 10 2011 121 574 A1 | 6/2013 | |
| DE | 102011121574 A1 * | 6/2013 | ............... H05B 3/18 |
| EP | 2 275 304 A1 | 1/2011 | |
| GB | 939292 A | 10/1963 | |
| WO | WO 02/19771 A1 | 3/2002 | |

OTHER PUBLICATIONS

International Search Report (PCT/ISA/210) issued in counterpart PCT Application No. PCT/EP2014/064275 dated Oct. 14, 2014 with English-language translation (four (4) pages).

German-language Office Action issued in counterpart German Application No. 10 2013 214 548.9 dated Mar. 17, 2014 (four (4) pages).

Chinese Office Action issued in counterpart Chinese Application No. 201480031104.7 dated Sep. 5, 2016 with English translation (12 pages).

Chinese Office Action issued in Chinese counterpart application No. 201480031104.7 dated May 27, 2017, with partial English translation (Five (5) pages).

* cited by examiner

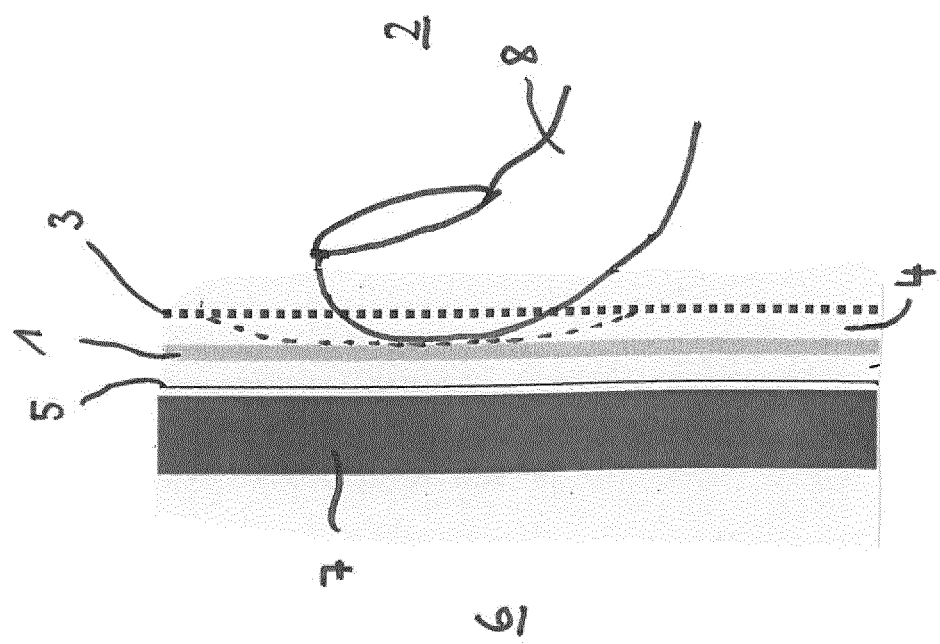

VEHICLE HAVING AN ELECTRIC HEATING DEVICE

CROSS REFERENCE TO RELATED APPLICATIONS

This application is a continuation of PCT International Application No. PCT/EP2014/064275, filed Jul. 4, 2014, which claims priority under 35 U.S.C. § 119 from German Patent Application No. 10 2013 214 548.9, filed Jul. 25, 2013, the entire disclosures of which are herein expressly incorporated by reference.

BACKGROUND AND SUMMARY OF THE INVENTION

The present invention relates to a vehicle having an electric heating device that reaches a temperature of greater than 50° C. during operation.

In connection with electric and hybrid vehicles, electrically driven heating devices for heating the passenger compartment are increasingly being studied.

Electric heating devices in vehicles have been known for many years in the form of seat heaters or steering wheel heaters. Seat heaters and steering wheel heaters are based on the principle of thermal conduction and provide customers with heat only for the common area of contact between heated surface and the customers. For purposes of burn protection, the temperature must not exceed about 40° C. It is therefore only possible to provide a small amount of heat output, and only the contacting body part is heated. Such heating devices are therefore not suitable for effectively and sufficiently heating the passenger compartment, i.e., the air located in the passenger compartment.

Electric heating devices that are based on PTCs or an "electrical heating of heating water" heat the air for the entire passenger compartment and thus heat the passengers through convective heat transmission. Due to the relatively poor convective heat transmission, a relatively high level of heating output is required; what is more, vehicle parts located on the interior of the vehicle are heated as well.

It is an object of the invention to provide a vehicle with an electric heating device having a sufficiently high level of heat output for heating the passenger compartment, as well as a sufficiently high level of safety against burns.

This and other objects are achieved by a vehicle with an electric heating device that reaches a temperature of greater than 50° C. during operation. A planar, perforated decorative layer is arranged on a front side of the electric heating device. The heating device is capable of emitting infrared radiation through holes provided in the decorative layer directly into a passenger compartment of the vehicle due to the porosity of the decorative layer. A reflector layer is arranged on a rear side of the heating device facing away from the front side and is provided for the purpose of reflecting infrared radiation emitted by the heating device in the direction of the passenger compartment.

The starting point of the invention is the idea of using an "infrared heater" for controlling the temperature of the passenger compartment. The term "infrared heater" is to be understood in the following as a heating device that reaches a temperature in the range of between 50° C. and 120° C. when in operation and a temperature of at least 50° C., preferably greater than 70° C., when operated at full capacity.

An infrared heater (e.g., EP 2275304 A1) makes use of the radiation principle as the mechanism of heat transmission and enables efficient heating. Here, the customer need neither be blown on nor come into contact with the radiator/heating element. However, a design is required that prevents burning of the passengers in case of contact.

In the case of such high temperatures of the heating device, measures must be taken in order to reliably prevent burning of occupants of the passenger compartment.

According to the invention, a provision is made that the heating device is arranged "behind" a planar, perforated decorative layer of the vehicle. e.g., behind side door panels. The decorative layer is thus arranged on a "front side" of the heating device and thus prevents direct contact between a passenger and the heating device.

The heating device can also be embodied so as to be planar, e.g., as a "heating film." Due to the "porosity" (optical permeability) of the decorative layer, the heating device can emit thermal radiation (infrared radiation) directly through the decorative layer into a passenger compartment of the vehicle.

To improve the heat emission into the passenger compartment, i.e., to minimize heat losses into the vehicle structure, a reflector layer can be arranged on a rear side of the heating device facing away from the front side of the heating device. The reflector layer is provided in order to reflect heat in the direction of the passenger compartment.

In addition, a thermal insulation layer can be provided on a rear side of the reflector layer facing away from the heating device in order to reduce heat losses, i.e., heat emissions into a vehicle component arranged behind the heating device (e.g., structural parts of a vehicle door, structural parts of an instrument panel, etc.).

It was already mentioned that, in an infrared heating device integrated into a vehicle, measures must be taken in order to rule out danger of burning human body parts (e.g., hands, fingers, etc.). Tests have shown that a continuous flow of heat aimed into human body parts (e.g., hands, fingers, etc.) that is not greater than about $$0.05 \frac{W}{cm^2}$$

is still just barely perceived as a pain-free heat flow. Greater heat flows are perceived as painful or at least unpleasant and must therefore be avoided.

An electric infrared heating device for a vehicle should therefore be designed and integrated into the vehicle such that, when a decorative layer is contacted over a time period of more than 5 seconds, the heat flow regarded as still barely admissible (about $$0.05 \frac{W}{cm^2}$$

) is not exceeded. When setting up the "contact protection," various physical processes must be considered.

A first such process that appears to be essential is the "heat absorption through temperature equalization between decorative layer and contacting body part." If the decorative layer is not contacted, then a certain, relatively high "radiator temperature" sets in. When the decorative layer is contacted, for example with a finger or hand, heat is transmitted to the contacting body part. A certain "temperature equilibration" takes place. As a result of the temperature equilibration, the surface temperature of the decorative layer is reduced. In order to prevent burns, it is important that the amount of heat stored in a surface unit of the radiator, i.e., the decorative layer, is sufficiently small compared to the heat that can be stored in the corresponding skin surface. This is a necessary prerequisite for maintaining the temperature on the skin below a "critical skin temperature" of about 40 to 45° C. during contact with the decorative layer. A comparison of the heat capacities of the heating device, of the decorative layer and of the body part in question yields corresponding physical requirements for the heating device and the decorative layer.

Another aspect that must be considered is the "heat transmission from the heating device to the skin of the contacting body part during extended contact." During longer-lasting contacting of the decorative layer, the dominant process of the heat absorption into the contacting body part is the heat transmission from the heating device through the decorative layer into the skin and, from there, to the sensory cells. One essential factor in this context is the thermal conductivity of the decorative layer. Since the heat transmission resistances between the decorative layer and the skin are relatively small, the thermal conductivity of the decorative layer must not exceed a predetermined value.

The "optical permeability of the decorative layer" must also be considered. The heating device should be able to transmit as large a portion as possible of the infrared radiation it emits in an unhindered a manner, i.e., directly into the passenger compartment. The decorative layer should therefore not absorb too much heat output in order to ensure that the decorative layer does not heat up excessively. The infrared permeability of the decorative layer is significantly determined by the perforation ratio of the decorative layer. The greater the perforation ratio, the greater the infrared permeability of the decorative layer.

In consideration of the abovementioned physical aspects, there is a measure according to the invention in the design of the decorative layer and the selection of the material of the decorative layer. The decorative layer should be embodied such that its specific thermal capacity, i.e., its thermal capacity per unit of surface area, is less than or equal to $$1 \frac{KJ}{m^2 \cdot K},$$

particularly less than or equal to $$0.3 \frac{KJ}{m^2 \cdot K}.$$

Furthermore, it is not only the thermal capacity of the decorative layer that should not exceed a certain maximum value, but also its thermal conductivity. Preferably, the thermal conductivity of the decorative layer should be less than or equal to $$0.5 \frac{W}{m \cdot K}.$$

The thermal conductivity of the decorative layer is preferably even less than or equal to $$0.1 \frac{W}{m \cdot K}.$$

To achieve good permeation of the radiation through the decorative layer, the decorative layer should have a perforation ratio of at least 20%. The greater the perforation ratio, the better the direct permeation. The perforation ratio could also be on the order of at least 30%, or at least 40%, of the surface area taken up or covered by the decorative layer, for example.

The decorative layer can be embodied as a "textile element," for example. A decorative layer that is embodied in the manner of a woven, weft-knitted or warp-knitted fabric or the like is contemplated.

As mentioned previously, the heating device can be embodied as a "planar heating device" (panel heater), for example as a heating film. A panel heater is very generally a relatively thin device with a large surface through which current flows. Due to its electrical resistance, the flow of current creates heat, which is used to heat the passenger compartment.

The heating device can be embodied as a "film" containing conductive components or to which conductive components are applied. For example, the conductive components can be fine carbon fibers or the like. The heating film can consist of a material mixture that contains paper components and electrically conductive components, such as carbon fibers, for example. Alternatively, the heating device can have a non-conductive carrier substrate and an electrically conductive layer applied thereto, such as an electrically conductive layer of paint, for example.

For the purpose of protection from burns, the thermal conductivity of the heating device should also not exceed a certain maximum limit. Tests have shown that it is advantageous if the specific thermal capacity, i.e., its thermal capacity per unit of surface area, is less than or equal to $$3 \frac{KJ}{m^2 \cdot K},$$

particularly less than or equal to $$1 \frac{KJ}{m^2 \cdot K}.$$

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows the schematic layout of an electric heating device according to an embodiment of the invention.

DETAILED DESCRIPTION OF THE DRAWINGS

An electric heating device according to the invention can be integrated into a vehicle door, an instrument panel, a vehicle roof, etc.

The core component of an electric heating device is an infrared radiator 1 which can be formed, for example, by an electrically conductive, resistive heating film. Heat is generated when electric current flows through the heating film 1. The heating film 1 is arranged behind a decorative layer 3 when seen from the passenger compartment 2.

The decorative layer 3 has a relatively high optical transparency, and the perforation ratio of the decorative layer lies, for example, in the range of at least 20%, at least 30% or at least 40%. The decorative layer can be embodied as a woven, weft-knitted or warp-knitted fabric, for example.

An air gap 4 can be provided between the decorative layer 3 and the heating film 1. Such an air gap 4 need not necessarily be provided, however. In any case, the decorative layer 3 should be made of a material that is at least temperature-resistant enough that it is not damaged by continuous contact with the heating film 1. Depending on the operating temperature of the heating film 1, the material of the decorative layer must therefore be able to withstand temperatures of at least 70° C. or 120° C.

A layer (IR reflector) 5 that reflects infrared radiation is arranged on a rear side of the heating film 1 facing away from the decorative layer 3. The reflector layer 5, which can be formed by an aluminum foil or the like, is provided for the purpose of reflecting heat in the direction of the passenger compartment 2. This layer or film can be optimized such that it has a reflection coefficient that is as high as possible.

To minimize heat losses into a vehicle structure 6 (not shown in further detail), or prevent such losses to the greatest possible extent, an insulation layer 7 is provided on a rear side of the reflector layer 5 facing away from the heating device 1.

When a body part, such as a finger 8, for example, is now pressed against the decorative layer 3, it comes to rest against the heating film 1. In order to ensure that no burns can occur during contact with the decorative layer 3, the thermal capacity of the decorative layer 3 by unit of surface area should be less than or equal to $$1 \frac{\text{KJ}}{\text{m}^2 \cdot \text{K}},$$

particularly less than or equal to $$0.3 \frac{\text{KJ}}{\text{m}^2 \cdot \text{K}}.$$

Alternatively or in addition, a provision should be made that the thermal conductivity of the decorative layer is less than or equal to $$0.5 \frac{\text{W}}{\text{m} \cdot \text{K}},$$

preferably even less than or equal to $$0.1 \frac{\text{W}}{\text{m} \cdot \text{K}}.$$

Alternatively or in addition, a further provision should be made that the thermal capacity of the heating film 1 by unit of surface area is less than or equal to $$3 \frac{\text{KJ}}{\text{m}^2 \cdot \text{K}},$$

particularly less than or equal to $$1 \frac{\text{KJ}}{\text{m}^2 \cdot \text{K}}.$$

Insofar as individual or all of the abovementioned parameters are considered when setting up the "infrared heater," the heating film 1 can be operated without problems at temperatures of up to 90° C., 120° C. or possibly even at higher temperatures without danger of burns.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   an electric heating device which, in operation, reaches a temperature of greater than 50° C., wherein the electric heating device has a front side facing a passenger compartment of the vehicle;
   a planar, perforated decorative layer arranged on the front side of the electric heating device so as to be disposed between the electric heating device and the passenger compartment;
   a reflector layer arranged on a rear side of the electric heating device, the rear side facing away from the front side, wherein
   the electric heating device is configured to emit infrared radiation through holes of the planar, perforated decorative layer directly into a passenger compartment of the vehicle due to the porosity of the decorative layer, and
   the reflector layer is configured to reflect infrared radiation, emitted by the electric heating device, in a direction of the passenger compartment,
   wherein an air gap is disposed between the electric heating device and the planar, perforated decorative layer such that a planar space is provided between and parallel to the electric heating device and the planar, perforated decorative layer.

2. The vehicle according to claim 1, further comprising:
   an insulation layer arranged on a rear side of the reflector layer, the rear side facing away from the electric heating device, wherein
   the insulation layer is configured to reduce heat emission into a vehicle compartment.

3. The vehicle according to claim 1, wherein the decorative layer has a perforation ratio of at least 20%.

4. The vehicle according to claim 1, wherein the decorative layer has a perforation ratio of at least 30%.

5. The vehicle according to claim 1, wherein the decorative layer has a perforation ratio of at least 40%.

6. The vehicle according to claim 1, wherein the decorative layer is formed of a woven, weft-knitted, or warp-knitted fabric.

7. The vehicle according to claim 3, wherein the decorative layer is formed of a woven, weft-knitted, or warp-knitted fabric.

8. The vehicle according to claim 1, wherein the decorative layer has a thermal capacity per unit of surface area less than or equal to $$1 \tfrac{KJ}{m^2 \cdot K}.$$

9. The vehicle according to claim 1, wherein the decorative layer has a thermal capacity per unit of surface area less than or equal to $$0.3 \tfrac{KJ}{m^2 \cdot K}.$$

10. The vehicle according to claim 1, wherein the decorative layer has a thermal conductivity less than or equal to $$0.5 \tfrac{W}{m \cdot K}.$$

11. The vehicle according to claim 1, wherein the decorative layer has a thermal conductivity less than or equal to $$0.1 \tfrac{W}{m \cdot K}.$$

12. The vehicle according to claim 1, wherein the electric heating device is a heating film.

13. The vehicle according to claim 1, wherein the electric heating device includes paper and carbon fiber components.

14. The vehicle according to claim 1, wherein the electric heating device comprises a carrier substrate and an electrically conductive layer.

15. The vehicle according to claim 1, wherein the electric heating device has a thermal capacity per unit of surface area less than or equal to $$3 \tfrac{m^2 \cdot K}{KJ}.$$

16. The vehicle according to claim 1, wherein the electric heating device has a thermal capacity per unit of surface area less than or equal to $$1 \tfrac{KJ}{m^2 \cdot K}.$$

17. The vehicle according to claim 1, wherein the electric heating device is configured to reach a temperature of 70° C. during operation.

18. The vehicle according to claim 1, wherein the electric heating device is configured to reach a temperature of 100° C. during operation.

19. The vehicle according to claim 1, wherein the electric heating device is configured to reach a temperature of 120° C. during operation.

* * * * *